Aug. 6, 1929.  J. BROOKBANK  1,723,914
AIRCRAFT
Filed Feb. 18, 1928   2 Sheets-Sheet 1
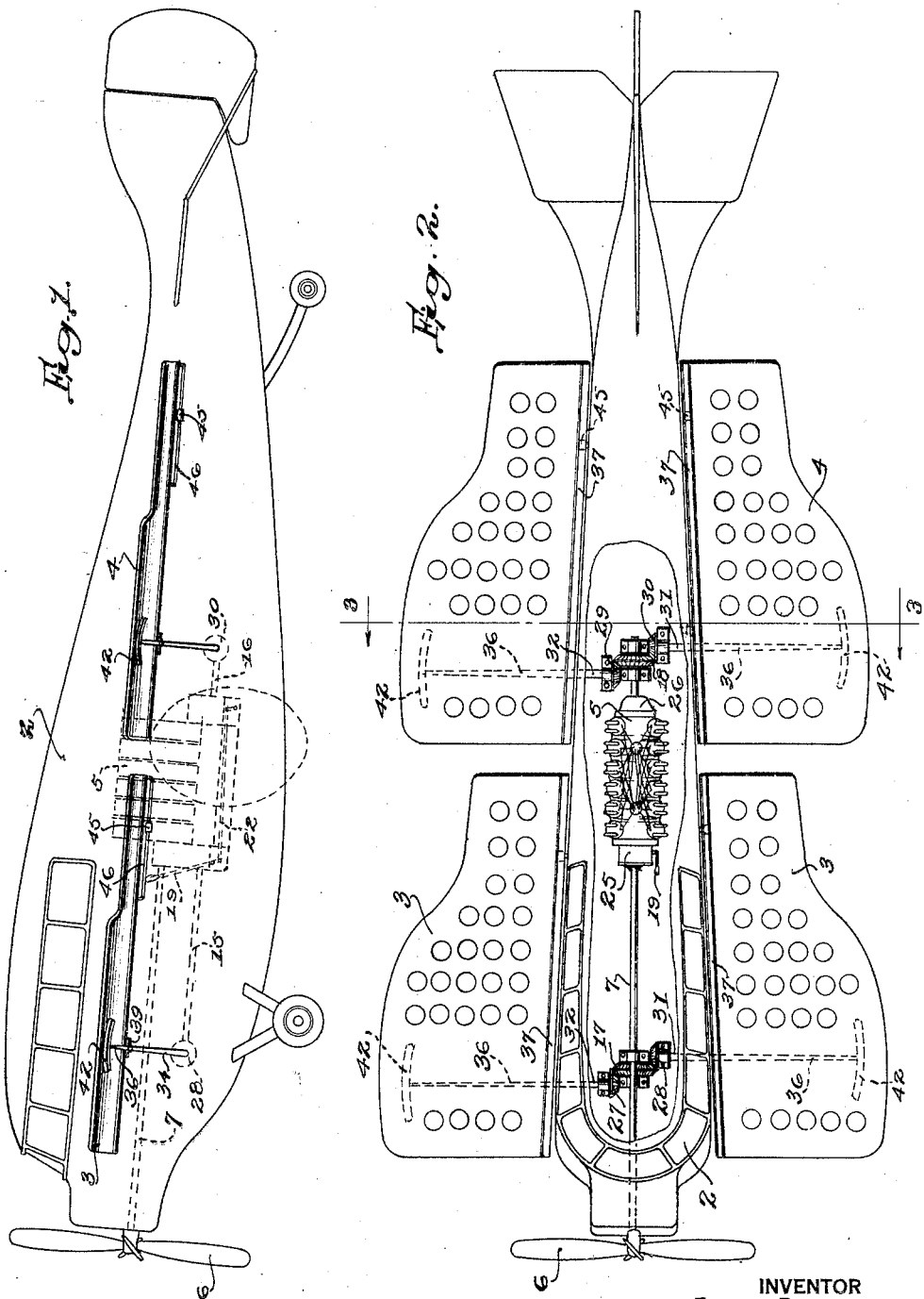
INVENTOR
JOHN BROOKBANK
BY
ATTORNEY Aug. 6, 1929.  J. BROOKBANK  1,723,914
AIRCRAFT
Filed Feb. 18, 1928   2 Sheets-Sheet 2
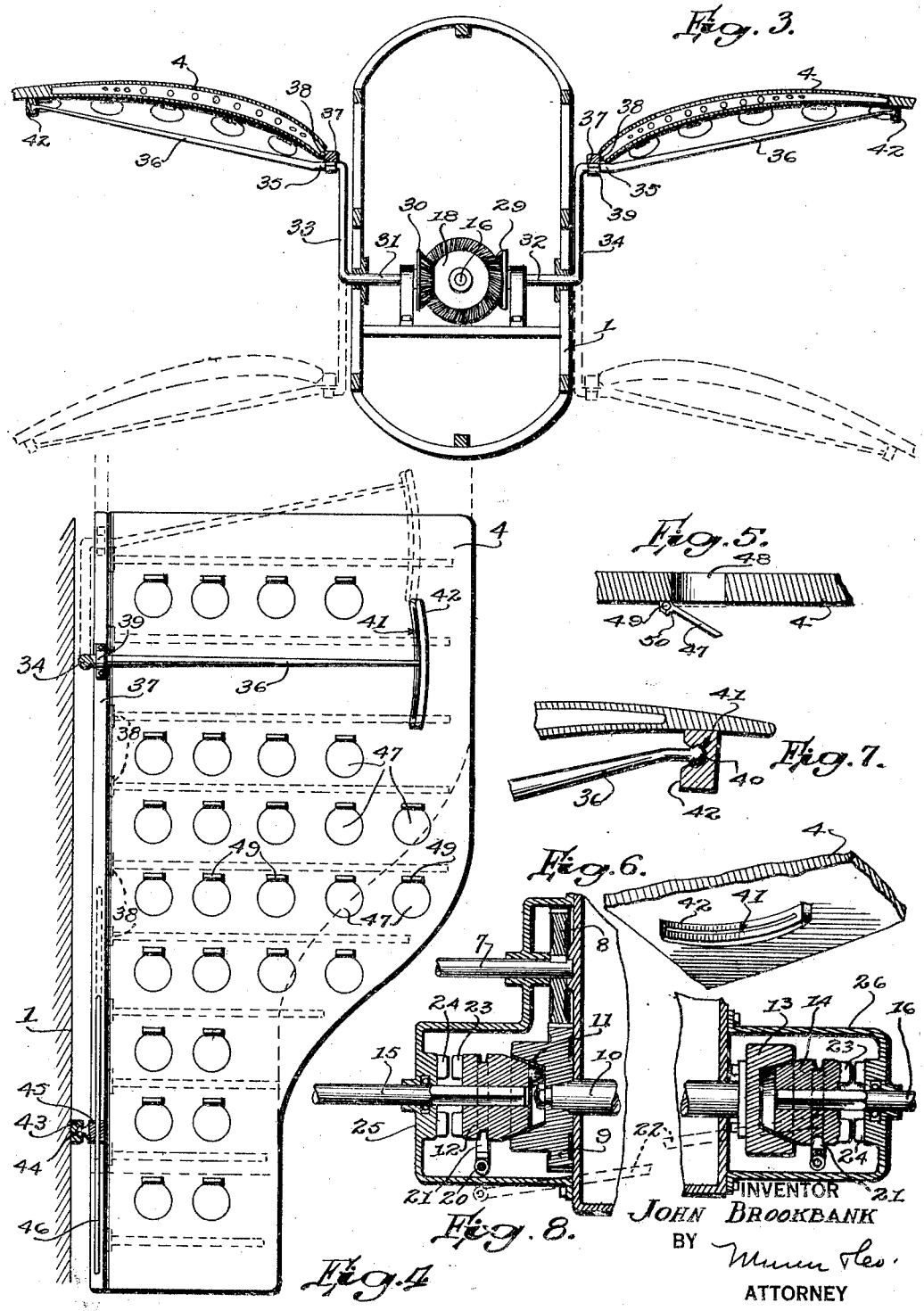
INVENTOR
JOHN BROOKBANK
BY Munn&Co.
ATTORNEY Patented Aug. 6, 1929.

1,723,914

UNITED STATES PATENT OFFICE.

JOHN BROOKBANK, OF DETROIT, MICHIGAN.

AIRCRAFT.

Application filed February 18, 1928. Serial No. 255,338.

This invention relates to aircraft, especially of the heavier-than-air type, and it consists of the constructions, combinations and arrangements herein described and claimed.

An object of the invention is to provide a mechanism for operating the wings or planes of an aircraft with a motion closely simulating the characteristic wing action of birds.

Another object of the invention is to provide a wing or plane construction that will permit the foregoing action of said mechanism, a necessary concomitant of the particular wing construction being the employment of valves that will close on a down stroke and open on an up stroke.

Other objects and advantages appear in the following specification, reference being had to the accompanying drawings in which, Figure 1 is a side elevation of an aircraft having the improved wing or plane construction embodied therein, Figure 2 is a plan view of the structure in Figure 1, a portion of the cabin being broken away to reveal internal construction, Figure 3 is a cross section taken substantially on the line 3—3 of Figure 2, Figure 4 is an inverted plan view of one of the wings, a portion of the fuselage being shown in section, Figure 5 is a detail cross section of one of the flap valves, Figure 6 is a detail perspective view of one of the crank end guides, Figure 7 is a detail sectional view illustrating the swivel connection between a crank and wing, Figure 8 is a detail sectional view illustrating a clutch arrangement.

Recent rapid strides in the development of aircraft of all types have initiated a step in the present instance toward the utilization of modes of propulsion other than those commonly known. One of the oldest and consequently most familiar mode of aerial travel is identified with that of birds.

The flight of birds depends, primarily, upon the propulsion of the bird by wing action. The soaring of birds in flight introduces the use of certain air currents of which the bird intuitively takes advantage in sustaining itself over relatively long periods. It is proposed to confine the following description to mechanical constructions and operations, and to reserve any theories applicable to soaring for such condition that may develop as being pertinent in the practical use of the invention.

Reference is made to the drawings. The fuselage 1 (Fig. 3) is of a shape to permit the addition of a cabin 2 (Fig. 1), the details of construction of which are neither shown nor regarded as essential for the understanding of the invention. Necessarily the aircraft requires sustaining planes, these being herein disclosed as pairs of wings 3 and 4.

An engine 5 provides the motive power for both a propeller 6 and the foregoing wings. A shaft 7 carries the propeller and is driven by suitable gearing as illustrated, for example, in Figure 8. A pinion 8 on the propeller shaft is driven by a gear 9 on the engine or crank shaft 10. The gear 9 is keyed to the engine shaft. It has a clutch hub 11 with which a clutch 12 is engageable. The opposite end of the engine shaft has a clutch hub 13 with which a clutch 14 is engageable. The two clutches are slidably mounted upon non-circular portions of crank shaft extensions 15 and 16. These extensions are independent, and carry double gears 17 and 18 by which the wings are operated as presently appears.

A lever 19, carried by the exposed end of a clutch shaft 20, provides for the simultaneous engagement or disengagement of both clutches with the respective hubs. Two clutch yokes 21 are connected by a rod 22 that permits the foregoing operation in a manner readily perceived in Figure 8.

As long as the clutches 12 and 14 remain engaged with the respective hubs 11 and 13 the shaft extensions 15 and 16 will be driven and the pairs of wings caused to move up and down with the characteristic wing motion. The extensions 15 and 16 are separate from the engine shaft 10. In order that the pairs of wings may be held stationary at such times when the clutches are disengaged, the latter are provided with teeth 23 designed to interlock with teeth 24 respectively on the adjacent clutch housing 25 and the housing 26 of the extension 16. The engagement of the various teeth will prevent the extensions 15 and 16 from turning and thereby hold the pairs of wings in position.

Driving power for the movement of the pairs of wings is derived from the double gears 17 and 18 mentioned before. The respective gears mesh with pinions 27, 28 and 29, 30 on the crank shafts 31 and 32 of the pairs of wings. Reference is had to Figures 3 to 7 for the crank shaft and wing construction, the structure of each pair of wings being the same.

The shafts 31 and 32 are bent at right angles as indicated at 33 and 34 then bent outwardly in parallelism to the crank shafts as at 35. The portions 35 are relatively short, the crank extensions 36 thereof being disposed at an inclination to the axes of said portions 35 in order to produce a relative rocking of the wings while moving up and down.

A sill 37 comprises the element that carries the wing and in respect to which the foregoing relatively rocking occurs. Hinges 38 provide the connectors between the wing and sill, and permit said relative rocking. By preference the hinges are concealed within the wing, but the mode of incorporation of the hinges may obviously vary.

A suitable bearing 39 secures the sill 37 to the crank portion 35. Rotation of a crank shaft 32, for example, will move the sill 37 up and down in a plane perpendicular to the axis of the crank shaft. The extremity of the crank extension 36 is made in the form of a ball 40. This ball is suitably combined with the slot 41 of an arcuate guide 42. The slot is so formed as to confine the ball, Figure 7 illustrating the arrangement. Although the ball is slidable along the slot the connection of the crank extension with the guide 42 is, nevertheless, that of a swivel.

The necessity for a slidable connection between the extremity of the crank extension and the guide 42 arises from the offset disposition of the former. It is the offset of the crank extension that imparts the relative rocking motion to the wing while the latter is moving up and down with the sill 37. The offset of the crank extension requires the arcuate guide 42 within which the extremity of the extension may move, the travel of the ball 40 being from one extremity to the other of the slot 41 as the associated crank shaft 32 rotates.

The foregoing wing actions require a mounting of a particular character upon the fuselage of the aircraft. This must be a swivel mounting or articulated connection. A socket 43 (Figure 4) suitably fixed to the fuselage 1, receives the ball 44 of a hub 45 which receives and is slidable upon a bar 46 carried by the sill 37. The wing is capable of turning in all directions in respect to the fuselage by virtue of the foregoing mounting, but the latter is only called upon to permit up and down and slight lateral rocking movements of the wing. The wing rides forwardly and backwardly in respect to the hub 45 as it responds to the action of the crank shaft.

In order that full advantage of the wing surface may be had upon the down stroke, and that an up stroke may be made with the least effort, each wing is provided with a plurality of flap valves 47 that control openings 48 through the wing. The flap valve 47 (Fig. 5) is suitably hinged at 49 on the underside of the wing, the valve having a shoulder 50 that engages a portion of the hinge structure to limit the opening movement of the valve on an up stroke of the wing. The degree of opening of the valve 47 may be regulated by making the shoulder 50 longer or shorter than shown. It would be undesirable to have the flap valve open too far because then the action of the air upon a down stroke might not serve to close the valve as it should.

The operation is readily understood. Assume the aircraft to be resting on the ground. The engine 5 is started, and the propeller 6 revolved by virtue of the gear connections between the engine and propeller shafts 10 and 7 in Figure 8. The connection of the propeller shaft with the engine shaft through the gear train is perpetual. One is not capable of disconnection from the other, as is the case of the engine shaft extensions 15 and 16.

Actual practice will demonstrate the desirability of either holding the pairs of wings 3 and 4 stationary or permit them to move up and down when beginning a flight. It is assumed to be desirable to set the wings in motion. The clutch lever 19 is moved so as to simultaneously engage the clutches 12 and 14 (Figure 8) with the hubs 11 and 13 of the engine shaft. Both shaft extensions 15 and 16 are caused to turn. The crank shafts 31 and 32 of each pair of wings are turned. The action of the cranks and wings is pictured in Figure 3, the extremities of up and down movement being indicated by the full and dotted line positions.

The movement of the crank portions 35 in a circular path causes an up and down movement of the sills 37 which are connected thereto by the bearings 39. The resulting forward and backward motion of the wings is compensated for by the slidable connection of the bar 46 with the swivel hub 45 (Figure 4). The offset in the crank extensions 36 causes the extremities to move in a larger circle than the crank portions 35. The amplitude of vibration of the wing tips is therefore greater than that of the bases adjacent to the sills 37.

This increase in vibration or movement is compensated for by the swivel connection of the crank extensions 36 with the arcuate guides 42. The ball ends 40 ride in the slots 41. The leading edge of each wing moves in a circle at a substantially uniform rate. The lateral wing tips partake of the relative rocking motion occasioned by the offsets of the crank extensions. The relative rocking motion is permitted by the swivel connection of the ball 40 with the arcuate guide 42.

Should the aviator desire to hold the wings stationary he has only to move the clutch lever 19 in the appropriate direction to disengage the clutches 12 and 14. The engine will then drive the propeller 6 alone. The engagement of the teeth 23 of the clutches with the adjacent stationary teeth 24 will serve to keep the shaft extensions 15 and 16 from turning and hold the wings in a rigid position. They then act as planes.

It may be stated that the clutch arrangement in Fig. 8 might be substituted by some other, and perhaps more efficient mechanism. It is necessary to disengage the driving mechanism of the wings from the engine shaft at times. It is also necessary to hold the wings rigid at such times in order that they may properly sustain the aircraft. The mechanism in Fig. 8 offers one solution of the problem. In practice, it may be regarded desirable to incorporate any known type of clutch in the propeller shaft 7, so that the propeller 6 may be rendered inoperative at times.

While the construction and arrangement of the aircraft is that of a generally preferred form, obviously modifications and changes may be made without departing from the spirit of the invention or scope of the claims.

I claim:—

1. An aircraft comprising a fuselage, planes, means by which the planes are movably connected near the trailing edges to the fuselage, an engine carried by the fuselage, and crank shafts driven by the engine and connected with the planes near the leading edges to move said edges in substantial circles to produce an up and down motion of the planes, said connections serving as pivots.

2. An aircraft comprising a fuselage, planes, connecting means permitting turning and sliding motions joining the planes near the trailing edges to the fuselage, an engine carried by the fuselage, and crank shafts driven by the engine and being connected with the planes near the leading edges revolving said edges in a circle and causing an up and down motion of the planes.

3. An aircraft comprising a fuselage, planes, connecting means permitting turning and sliding motions joining the planes with the fuselage, an engine carried by the fuselage, crank shafts driven by the engine, crank extensions from said shafts, and means for movably connecting the planes with said extensions.

4. An aircraft comprising a fuselage, an engine, crank shafts driven by the engine having crank portions and offset extensions, planes having sills and hinges joining the sills and planes, means movably connecting the sills with the crank portions, guide means carried by the planes movably receiving the offset extensions, and articulated connections joining the sills with the fuselage permitting up and down and relative rocking motion of the planes in respect to the sills in conformity with the characteristic action of said crank portions and extensions.

5. In an aircraft having a fuselage and an engine, a plane having a sill and hinges by which the plane is movably attached to the sill, a bar carried by the sill, a swivel socket carried by the fuselage, a crank shaft driven by the engine having a crank portion and an offset extension, a bearing by which the sill is movably attached to the crank portion, guide means on the planes movably receiving the offset extension, and a swivel hub fitted in the socket and slidably receiving the bar, providing an articulated connection.

6. In an aircraft having a fuselage and an engine, a plane having a sill and hinges movably connecting the plane with the sill, an arcuate guide carried by the plane having a slot, a shaft driven by the engine having a crank portion and an offset extension with a ball end received by the slot, a bearing movably securing the crank portion to the sill, and an articulated connection for the plane to the fuselage comprising a swivel joint including a hub, and a bar carried by the sill being slidably received by the hub.

7. An aircraft comprising a fuselage, planes having connections with the fuselage permitting movement, a propeller, an engine having a shaft for perpetually driving the propeller, crank shafts having cranks attached to the planes, engine shaft extensions having means for driving the crank shafts, clutches movable into connection with the engine shaft for causing movement of the planes in consonance with the propeller said clutches having teeth, and relatively stationary teeth with which the clutch teeth may be interlocked upon disconnection with the engine shaft for holding the planes stationary while the engine continues to drive the propeller.

8. In aircraft, a plane, a sill for disposition along a fuselage, hinges by which a side edge of the plane is connected with the sill, an articulated connection for the sill to the fuselage permitting turning and longitudinal sliding movement of the sill, a driven shaft having a crank portion revolubly connected to the sill to turn the sill in a plane perpendicular to the axis of the shaft, said crank portion having an offset extension, and means on the plane receiving said extension guiding the extremity thereof during rocking of the plane relative to the sill.

9. In an aircraft, a movable plane and a propeller, an engine, separate means through which the driving power of the engine is applied to the plane and propeller, and means against which one of said separate means is movable to hold said separate means and the plane immovable.

10. In an aircraft, a movable plane and a propeller, an engine, means for driving the propeller from the engine and a clutch for transmitting driving power from the engine to the plane, and means against which the clutch is movable to disconnect the driving power and hold both the clutch and the plane immovable.

11. In an aircraft, a movable plane and a propeller, an engine, means for driving the propeller from the engine, a clutch for imparting driving power from the engine to the plane and having teeth, and relatively fixed teeth toward which the clutch is movable for disconnecting the driving power and interlocking the teeth to hold both the clutch and plane immovable.

12. An aircraft comprising a fuselage, a plane that is connected with the fuselage for movement, a prime mover having a clutch and connections with the plane for moving the latter upon its connection with the fuselage, and a relative fixture with which the clutch is movable for interlocking engagement to hold the plane in a fixed position relative to the fuselage.

13. An aircraft comprising a fuselage, a plane, means by which the plane is swivelly connected near the trailing edge to the fuselage, an engine and means driven by the engine and attached to the plane near the leading edge for rocking the plane upon the swivel connection and moving the leading edge in a circle.

14. A fuselage, a plane, means for swivelly and slidably connecting the plane near one end to the fuselage, and driving means connected near the other end of the plane for revolving said end in a circle and actuating the plane according to said swivel and slidable connections.

15. A fuselage, a plane, means for swivelly and slidably connecting the plane near one end to the fuselage, driving means connected near the other end of the plane for revolving said end in a circle and actuating the plane according to said swivel and slidable connections, and an offset in said driving means causing a relative rocking of the plane and a vibration of the wing tip in excess of that at the various connections.

16. A fuselage, a revoluble crank having an offset crank extension, and a plane connected movably at three points respectively to the fuselage, crank and to the extremity of said extension.

17. A fuselage, a revoluble crank having an offset crank extension, a plane, means by which the plane is connected with the crank and with the extremity of said extension, and a swivel and slidable connection between the plane and the fuselage accommodating various motions set up in the plane by virtue of the operation of the crank and said extension.

18. A fuselage, a plane movably connected thereto, a revoluble crank having an extension offset from the axis thereof, means movably connecting the plane with the crank to partake of an up and down motion, and an arcuate guide with which the extremity of the extension is swivelly connected.

Signed at Detroit in the county of Wayne and State of Michigan this 14th day of February, A. D. 1928.

JOHN BROOKBANK.